(12) United States Patent
Gaudin et al.

(10) Patent No.: US 8,654,954 B2
(45) Date of Patent: Feb. 18, 2014

(54) SYSTEM AND METHOD FOR CONTROLLING ACCESS TO CONFERENCE CALLS

(75) Inventors: Eric Gaudin, Montrouge (FR); Jack Jachner, Lexington, MA (US)

(73) Assignee: Alcatel Lucent, Paris (FR)

( * ) Notice: Subject to any disclaimer, the term of this patent is extended or adjusted under 35 U.S.C. 154(b) by 1738 days.

(21) Appl. No.: 11/619,191

(22) Filed: Jan. 3, 2007

(65) Prior Publication Data

US 2008/0159490 A1 Jul. 3, 2008

(51) Int. Cl.
*H04M 3/42* (2006.01)
*H04M 11/00* (2006.01)

(52) U.S. Cl.
USPC .................................. 379/204.01; 379/88.16

(58) Field of Classification Search
USPC .............. 455/416, 419; 379/202.01, 207.01, 379/88.14, 88.16, 204.01; 348/14.08, 348/14.11; 370/260; 709/204
See application file for complete search history.

(56) References Cited

U.S. PATENT DOCUMENTS

| | | | |
|---|---|---|---|
| 5,625,407 A * | 4/1997 | Biggs et al. | 348/14.11 |
| 7,085,364 B1 * | 8/2006 | Ahmed et al. | 379/202.01 |
| 2002/0037074 A1 * | 3/2002 | Dowens et al. | 379/88.14 |
| 2003/0156698 A1 * | 8/2003 | Creamer et al. | 379/207.01 |
| 2005/0031110 A1 * | 2/2005 | Haimovich et al. | 379/202.01 |
| 2006/0222155 A1 * | 10/2006 | Summers et al. | 379/202.01 |
| 2007/0067387 A1 * | 3/2007 | Jain et al. | 709/204 |
| 2007/0172046 A1 * | 7/2007 | Pfleging et al. | 379/202.01 |
| 2007/0208806 A1 * | 9/2007 | Mordecai et al. | 709/204 |
| 2008/0146212 A1 * | 6/2008 | Aaron | 455/419 |
| 2008/0165944 A1 * | 7/2008 | Rosenthal et al. | 379/202.01 |

\* cited by examiner

*Primary Examiner* — Duc Nguyen
*Assistant Examiner* — Sonia Gay
(74) *Attorney, Agent, or Firm* — Garlick & Markison

(57) ABSTRACT

A conferencing system enables conference participants to control external party access to an ongoing conference call by providing a conference server that includes a conference client operable to manage a conference call between conference participants, an interface operable to receive an instruction during the conference call that defines a policy to control external party access to the conference call and a processor for executing the conference client to initiate the conference call and process the instruction.

35 Claims, 7 Drawing Sheets

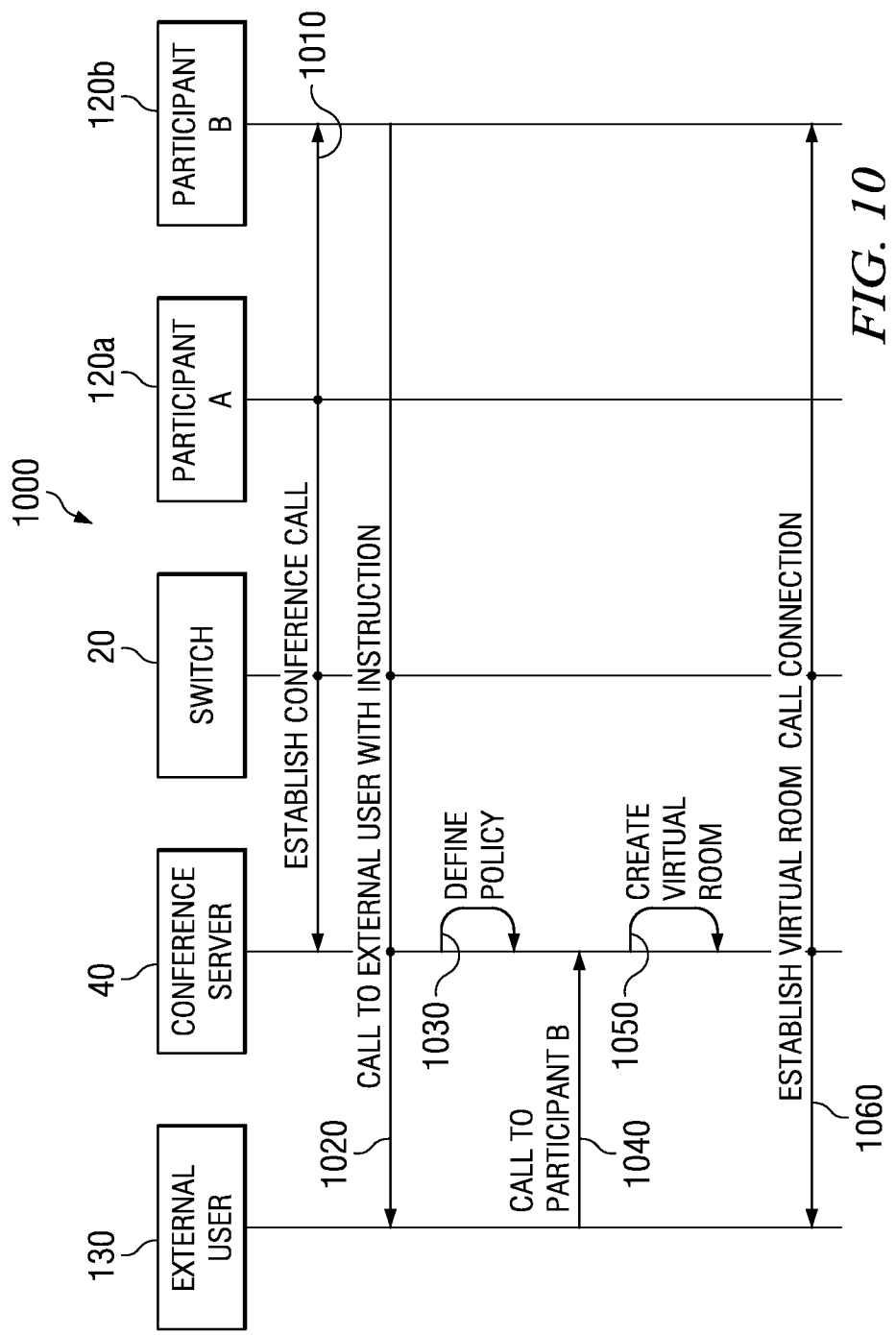

SYSTEM AND METHOD FOR CONTROLLING ACCESS TO CONFERENCE CALLS

BACKGROUND OF THE INVENTION

1. Technical Field of the Invention

The present invention relates in general to communications systems, and in particular, to conferencing systems for managing and controlling conference calls.

2. Description of Related Art

Conferencing systems provide a conference call service that enables three or more parties on different communications devices to participate in a single call. Traditionally, conferencing systems consisted of a private branch exchange (PBX) or local exchange carrier (LEC) that allowed a conference call originator to manually dial the other parties of the conference call, place them on "hold" and then patch them together by simultaneously releasing the holds.

More recently, conferencing bridge systems have been developed that utilize a conference bridge to combine multimedia communications from multiple communications devices for a multi-party call. The conference bridge may be located within a public or private network and may be implemented on a single (central conference bridge) switch or multiple switches. In conferencing bridge applications, a conference originator reserves a certain number of connections (i.e., ports) on a conference bridge by manually interacting with an operator of the conference bridge or by interacting with an automated conferencing bridge system. Once the conference originator has reserved the requisite number of ports on the bridge, the conference originator must provide each participant with a telephone number for the conference bridge and an access code for entering the conference call. To join the conference call, each participant must dial the telephone number for the conference bridge, and when prompted, enter the access code for the conference call.

Once the conference call has been established, the conference originator and/or participants to the conference call may want to add additional participants to the conference call or prevent external parties from disturbing or interrupting the conference call. However, current conferencing systems provide little or no control over external party access to the conference call itself or the individual conference call participants during the conference call.

For example, if a conference participant desires to add an external party to the conference call, the conference participant must dial the external party from the conference bridge, and if the external party does not answer, the conference participant must leave all of the conference bridge information (e.g., conference bridge number and access code) on the messaging system of the external party to enable the external party to call back into the conference call. Leaving such a message takes a considerable amount of time, thus producing an unwanted interruption of the meeting. In addition, if the conference bridge information changes or the conference call ends early, the external party may not be notified unless one of the conference participants remembers to leave the external party another voice message. Furthermore, the external party must first write down all of the conference bridge information and then enter the conference bridge information to join the conference call, thus delaying the external party's access to the conference call.

As another example, participants or the conference originator may not want to be disturbed during a particular meeting, and hence may not want to have calls coming into the physical meeting room communications devices or to their personal communications devices. Currently, in order to block incoming calls to each of these communications devices, the participants must separately activate a do not disturb (DND) or other similar feature (e.g., call forwarding to voice mail) on each individual communications device prior to the conference call, and then deactivate the DND feature on each individual communications device after the conference call. In addition, most DND features do not provide exceptions for authorized external parties, such as one of the participant's boss, assistant or spouse.

Therefore, what is needed is a conferencing system that enables conference participants to control external party access to an established conference call.

SUMMARY OF THE INVENTION

Embodiments of the present invention provide a conference controller including a conference client operable to manage a conference call between conference participants, an interface operable to receive an instruction during the conference call that defines a policy to control external party access to the conference call and a processor for executing the conference client to initiate the conference call and process the instruction.

In one embodiment, the policy includes a do not disturb filtering rule applied to communications devices associated with the conference participants and the conference call. The filtering rule blocks access to the communications devices by one or more external users during the conference call. In a further embodiment, the instruction also includes access authorization information identifying at least one authorized user that is allowed access to at least one communications devices during the conference call.

In another embodiment, the policy includes direct access information that allows an external user direct access to the conference call. In an exemplary embodiment, the instruction includes a reference identifying the user, and the processor authenticates the user using the reference to enable the user to directly access the conference call.

In yet another embodiment, the policy is operable to invoke transmittal of an automated message that includes conference call information to a voice mail box of the external user, in which the conference call information includes a call-back number that enables the user to join the conference call. In an exemplary embodiment, the instruction is received by the interface during a communications session between one of the conference participants and a voice mail system containing the voice mail box of the user. In a further embodiment, the policy enables the transmittal of automated updates of the current status of the conference call to the voice mail box of the user.

In still another embodiment, the policy is operable to create a virtual room between one of the participants and an external user during the conference call. In an exemplary embodiment, the instruction is automatically provided after an attempted virtual room communication session between the conference participant and the user during the conference call, and the policy is applied to future calls from the user to that conference participant. In a further embodiment, the policy is further operable to provide access to the virtual room by other conference participants. In still a further embodiment, the policy is further operable to provide the external user access to the conference call from the virtual room.

Embodiments of the present invention further provide a communications system that includes a switch connected to establish a conference call between conference participants and a conference server operable to manage the conference call and connected to receive an instruction during the conference call from one of the conference participants, in which the instruction defines a policy to control access to the conference call by at least one user external to the conference call. In a further embodiment, the communications system further includes a communications device associated with the conference call for initiating the instruction to the conference server.

Embodiments of the present invention further provide a method for controlling access to a conference call. The method includes the steps of establishing a conference call between conference participants, receiving an instruction during the conference call from one of the conference participants and defining a policy to control access to the conference call by at least one user external to the conference call based on the instruction. The method further includes the steps of receiving a call from the external user and selectively allowing the external user access to the participants of the conference call based on the policy.

BRIEF DESCRIPTION OF THE DRAWINGS

A more complete understanding of the present invention may be obtained by reference to the following detailed description when taken in conjunction with the accompanying drawings wherein:

FIG. 10 is a message flow diagram illustrating an exemplary message flow for creating a virtual room between a conference participant and an external user during an ongoing conference call, in accordance with embodiments of the present invention.

DETAILED DESCRIPTION OF THE DRAWINGS

Figure 1:
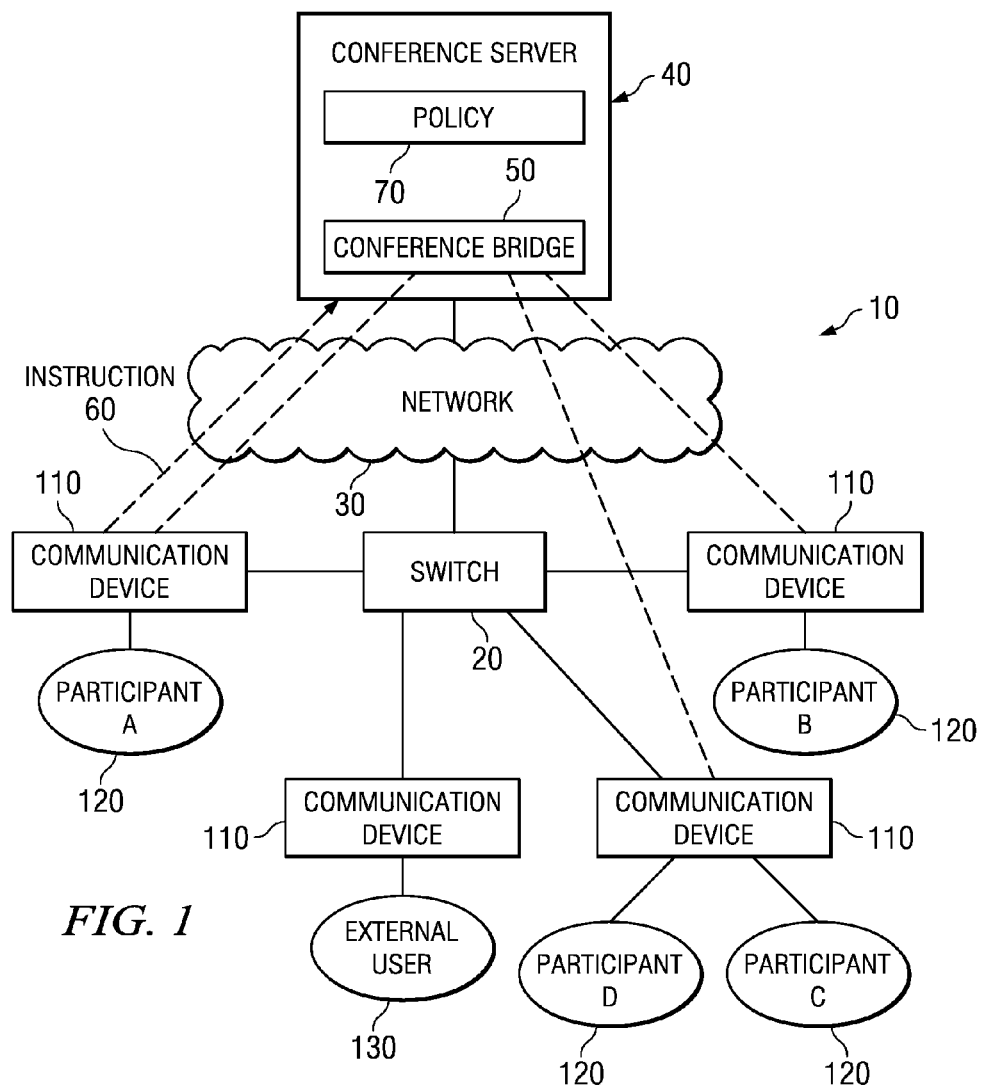
FIG. 1 illustrates an exemplary communications system providing a conference call service in accordance with embodiments of the present invention.

FIG. 1 illustrates an exemplary communications system 10 providing a conference call service, in accordance with embodiments of the present invention. The communications system 10 includes a switch 20, communications network 30, conference server 40 and communications devices 110. The communications network 30 represents any type of network over which voice media (circuit-switched or packet-switched) may be sent. For example, the communications network 30 may include one or more of the following: the Public Switched Telephone Network (PSTN), Public Land Mobile Network (PLMN), one or more private local area networks (LANs), the Internet and/or any other type or combination of networks.

The switch 20 is coupled to provide voice communications services to one or more communications devices 110. Each communications device 110 is a user-operated physical communications device capable of engaging in voice communications via switch 20. Examples of such communications devices 10 include, but are not limited to, a laptop computer, a personal computer, a desktop phone, a cell phone, a personal digital assistant (PDA) or other user-operated communication device. The switch 20 in FIG. 1 represents either a stand-alone switch or a network of switches, in which each of the switches in the network is a circuit switch, end office, PBX, IP router, gateway or other device capable of sending and/or receiving voice communications over communications network 30.

The conference server 40 provides the conference call service, and includes a conference bridge 50 capable of connecting multiple participants 120 on multiple communications devices 110 in a conference call. For example, in FIG. 1, Participants A, B, C and D are involved in a conference call. Participants A and B are connected to the conference bridge 50 via separate communications devices, while Participants C and D are connected to the conference bridge 50 via a shared communications device (e.g., a meeting or conference room phone). The conference server 40 is also referred to herein as a conference controller and may be a stand-alone device, as shown in FIG. 1, or included as part of the switch 20 and/or one or more communications devices 110. As a stand-alone device, the conference server 40 may be a computer network server, a telephony server (e.g., a circuit switch or end office, IP router, gateway, etc.), a web server or any other networked device capable of managing and controlling conference calls over communications network 30.

The conference server 40 is coupled to receive instructions 60 generated by one of the communications devices 110. The instructions 60 are entered by one of the conference participants 120 from their associated communications device 110 during the conference call and are transmitted from the communications device 110 to the conference server 40 via the switch 20 and communications network 30. The instructions are used by the conference server 40 to define a policy 70 for controlling access to the conference call by one or more external users 130. The policy 70 is applied to any incoming calls from the external user 130 to either the conference server 40 managing the conference call or to one of the conference participants 120 involved in the conference call.

In one embodiment, the conference server 40 maintains the policy 70 for internal use in controlling and managing the conference call on the conference bridge 50. For example, in an exemplary embodiment, the policy 70 may include direct access information that allows the external user 130 direct access to the conference call without authentication, thus obviating the need for the external user 130 to have knowledge of or enter an access code. In this exemplary embodiment, the instruction 60 can include a reference, such as a telephone number or user ID, that identifies the external user 130, and the conference server 40 can use this reference to enable the external user 130 to directly access the conference call. For example, if the instruction 60 includes a telephone number associated with the external user 130, when the external user 130 dials into the conference bridge 50 from a communications device 110, the conference server 40 compares the telephone number of the external user's communications device 110 to the telephone number stored by the policy 70, and if they match, the conference server authenticates the external user 130 and allows the external user 130 to immediately join the conference call without prompting the external user 130 for an access code or other authenticating information.

In another exemplary embodiment, the policy 70 may invoke transmittal of an automated message that includes conference call information (e.g., conference bridge information, such as a conference phone number and access code) to a voice mail box of the external user 130. For example, one of the conference participants 120 may want the external user 130 to join the conference call, and therefore, call the external user 130 via the conference bridge 50. If the external user 130 does not answer and the call is forwarded to the external user's voice mail box, the participant can provide an instruction 60 (e.g., enter a dual tone multi-frequency (DTMF) code or access a graphical user interface (GUI) that provides a conference application program interface (API) on the participant's communications device 110) to the conference server 40 that causes the conference server 40 to provide an automated message to the external user's voice mail box with the conference call information. Thus, the participant does not need to locate the conference call information and then verbally record the conference call information into the voice mail box of the external user 130. As a result, the conference call can continue without further interruption.

In still another exemplary embodiment, the policy 70 may create a virtual room between one of the participants 120 and the external user 130 during the conference call. For example, if one of the participants 120 attempts to initiate a communication session with the external user 130 via the conference bridge 50 and the external user does not answer, an instruction 60 can be provided by the participant 120 to define a policy 70 to place incoming calls from the external user 130 into a virtual room. The conference server 40 then applies that policy 70 to future calls from the external user 130 to that conference participant 120.

In another embodiment, the conference server 40 maintains the policy 70 for external use and control of various participant communications features outside of the conference bridge 50. For example, in an exemplary embodiment, the policy 70 may includes a do not disturb filtering rule applied to communications devices 110 associated with the conference participants 120 and the conference call. The filtering rule can block incoming calls from external users 130 to the communications devices 110 involved in the conference call and to other communications devices associated with the participants 120. For example, if one or more of the participants desires to activate the do not disturb feature on one or more of their communications devices, the participant can provide an instruction 60 to the conference server 40 that instructs the conference server 40 to access the switch 20 and activate the do not disturb feature associated with one or more of the participant's communications devices 110. The instruction 40 can apply to an individual participant 120 and/or individual communications devices 110 or to all participants 120 and/or all communications devices 110. In a further exemplary embodiment, the instruction 60 may also include access authorization information identifying at least one external user 130 whose incoming call is allowed to go through to at least one participant communications device 110 during the conference call.

In another exemplary embodiment, the policy 70 may include a call forwarding rule that instructs the conference server 40 to access the switch 20 and enable a call forwarding feature associated with one or more participant communications devices to forward incoming calls to the participant's communications device 110 from authorized external users 130 to the conference bridge 50. For example, when the external user 130 dials the telephone number for Participant A's communications device 110, the call is routed to the switch 20, and the switch 20 automatically forwards the call to the conference bridge 50. Upon receiving the incoming call, the conference bridge 50 can either prompt the external user for the access code to join the conference call, automatically join the external user 130 in the conference call (e.g., by applying a direct access policy 70 on the conference server 40) or place the external user 130 in a virtual room and notifying one of the participants that the external user 130 has entered the virtual room (e.g., by applying a virtual room policy 70 on the conference server 40).

Figure 2:
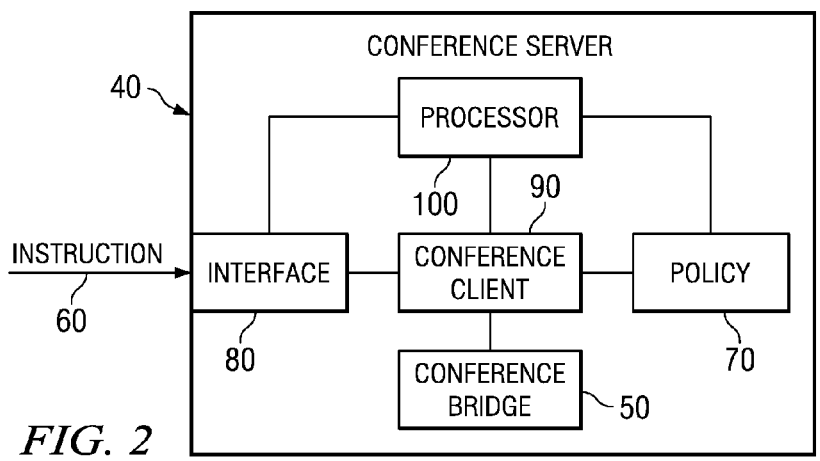
FIG. 2 illustrates an exemplary conference server in accordance with embodiments of the present invention.

Referring now to FIG. 2, a more detailed operation of the conference server 40 will now be described. The conference server 40 includes a conference bridge 50, interface 80, conference client (e.g., a conference application or software program) 90 and a processor 100. The processor 100 includes one or more processors that are capable of executing the conference client 90. As used herein, the term "processor" is generally understood to be a device that drives a general-purpose computer. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein.

As mentioned above, the conference server 40 can be a stand-alone device, included as part of a switch or other network device or included as part of a communications device, such as a meeting room or office phone or any other voice-capable communications device, such as a fixed phone, mobile phone, personal computer or PDA. In embodiments in which the conference server 40 is implemented on a communications device, the conference bridge 50 functionality is implemented by the conference client software application running on the communications device.

In a general operation of the conference server 40, the processor 100 accesses and runs the conference client 90 to initiate and control a conference call between multiple participants. During execution of the conference client 90, the conference client 90 is operable to perform one or more of the following: assign an access code for a conference call, reserve resources (e.g., ports) on the conference bridge 50 for the conference call and connect the conference participants together in a conference call via the conference bridge 50.

In addition, in accordance with embodiments of the present invention, the conference client 90 is further operable to control and manage access to the conference call and/or conference participants by one or more external users during the conference call. The conference client 90 communicates with the external interface 80 to receive an incoming instruction 60 from one of the conference participants during the conference call. The conference client 90 further processes the incoming instruction 60 to define one or more policies 70 for external user access during the conference call.

Once the processor 100 executes the conference client 90 to establish the conference call between the conference participants and define one or more policies 70 for the conference call, the processor 100 performs routines dictated by the policies 70. For example, in one embodiment, the processor 100 provides conference call information to a voice generation system and instructs the voice generation system to play an automated voice message containing the conference call information for recording in a voice mail box of an external user. The conference call information may include, for example, a phone number and access code to join the conference call and/or the status of the conference call. In another embodiment, the processor 100 sends a message to one or more switches to activate a "do not disturb" feature or a "call forwarding" feature for one or more communications devices associated with conference call participants. In yet another embodiment, the processor 100 stores references for one or more authorized external users, and compares the stored references to each new incoming call directed to the conference bridge to determine whether to block the incoming calls, join the incoming calls with the conference call or place the incoming calls in virtual rooms.

Figure 3:
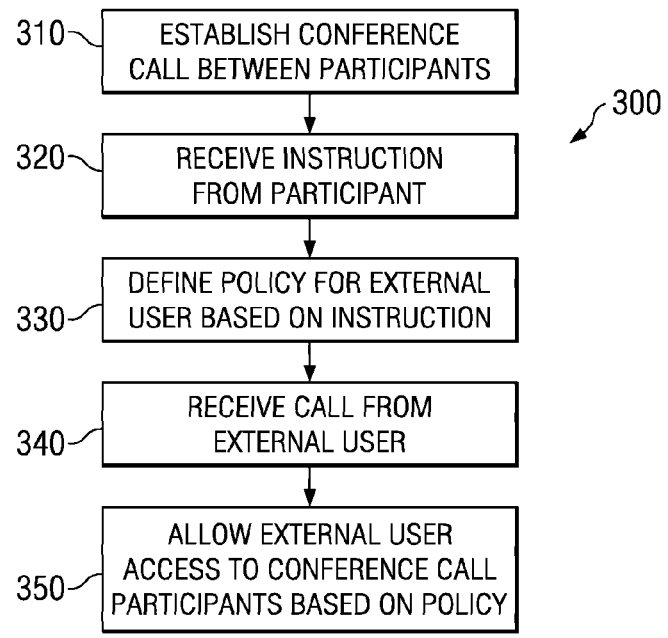
FIG. 3 is a flow chart illustrating an exemplary process for controlling access to a conference call, in accordance with embodiments of the present invention.

FIG. 3 is a flowchart illustrating an exemplary process 300 for controlling access to a conference call, in accordance with embodiments of the present invention. At block 310, a conference call is established between three or more conference participants on three or more separate communications devices. At block 320, an instruction is received from one of the conference participants during the conference call. Based on the instruction, at block 330, a policy is defined to control access to the conference call by at least one user external to the conference call. Thereafter, at block 340, when a call is received from the external user, at block 350, the external user is selectively allowed access to the conference participants based on the policy.

Figure 4:
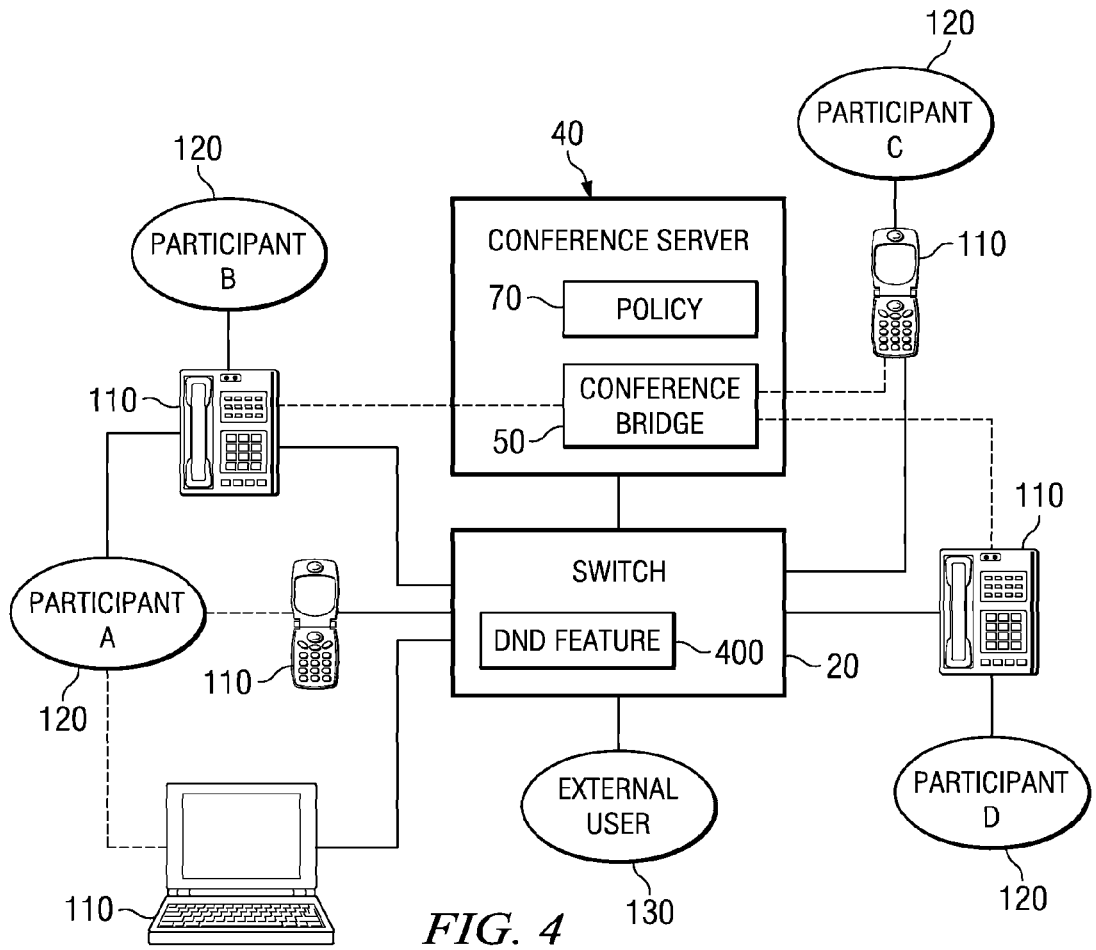
FIG. 4 illustrates an exemplary conferencing system for defining external user access to the conference call participants, in accordance with embodiments of the present invention.
Figure 5:
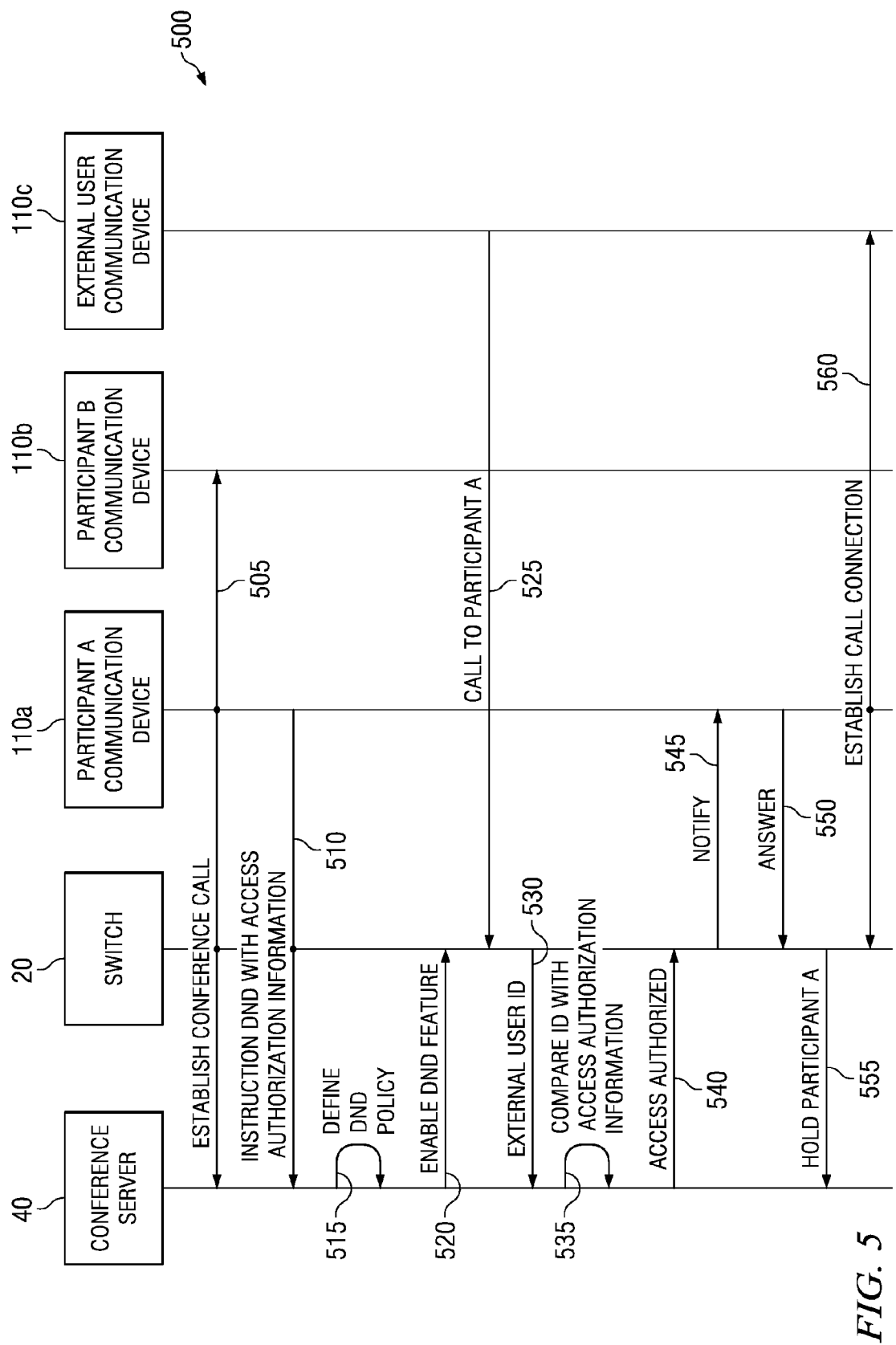
FIG. 5 is a message flow diagram illustrating an exemplary message flow for limiting external user access to an ongoing conference call, in accordance with embodiments of the present invention.

A more detailed description of the "do not disturb" policy follows in connection with FIGS. 4 and 5. In FIG. 4, Participants A, B, C and D are involved in a conference call via the conference bridge 50 on the conference server 40. Although each participant 120 may have multiple communications devices available to him/her, each participant 120 is connected to the conference call via only one communications device 110. For example, as shown in FIG. 4, Participant A has both a cell phone and a laptop computer, but is currently connected to the conference call on a meeting room or office phone shared with Participant B. The meeting room or office phone may be a desktop phone in Participant A's office or a conference room phone in a conference room.

During the conference call, one or more of the participants may provide an instruction to the conference server 40 to define a do not disturb policy 70 for one or more of the communications devices 110 associated with the conference call and/or the conference call participants to block incoming calls to those communications devices during the conference call. In another embodiment, the instruction or a partial instruction can be provided to the conference server 40 prior to the start of the conference call.

For example, in FIG. 4, Participant A may decide that he doesn't want to be disturbed during the conference call, and therefore, he would like all incoming calls from external users 130 that are directed to his desktop phone, cell phone or laptop computer to be forwarded to his voice mail. In accordance with embodiments of the present invention, Participant A can send an instruction (e.g., by entering a DTMF code into his desktop phone or by accessing a conference API from the meeting room phone) that defines a policy 70 in the conference server 40 to invoke a "do not disturb" (DND) feature 400 or other similar feature for all of Participant A's communications devices 110. In this example, based on the policy 70, the conference server 40 sends a message to each switch 20 (only one of which is shown in FIG. 4) that controls at least one of the communications devices 110 of Participant A. The message includes a request to activate the DND feature 400 for Participant A's communications devices 110.

Upon receipt of the message, the switch 20 activates the DND feature 400 to prevent incoming calls to any one of Participant A's communications devices 110 from reaching Participant A's communications devices 110. Instead, all incoming calls to Participant A received during the conference call are forwarded to a voice mail system associated with Participant A. At the completion of the conference call, the policy 70 further causes the conference server 40 automatically generates a "CLEAR DND" message to switch 20 that causes switch 20 to deactivate the DND feature 400 for Participant A.

To activate the DND feature for all of Participant A's communications devices, Participant A can provide the telephone numbers of each communications device to the conference server 40, the conference server 40 can store information identifying each of Participant A's communications devices (e.g., telephone numbers) or the conference server 40 can maintain a user ID for Participant A and provide this user ID to switch 20, which is capable of associating the user ID with all of Participant A's communications devices.

As another example, if Participant A decides that he does not want any of the participants to be disturbed during the conference call, and therefore, he would like all incoming calls to the meeting room phone or to any of the participant's personal communications devices to be blocked, Participant A can send an instruction that defines a policy 70 in the conference server 40 to invoke the DND feature 400 or other similar feature for all of the communications devices involved in the conference call and all of the other personal communications devices of each of the participants in the conference call. In this example, based on the policy 70, the conference server 40 sends a DND message to each switch 20 that controls at least one of the communications devices 110 involved in the conference call or controls at least one of the personal communications devices of the conference participants.

As a further example, if Participant A decides that he does not want any of the participants to be disturbed during the conference call, but he would like to allow certain external users to be able interrupt the meeting (e.g., allow certain external users to join the conference call and/or access the personal communications devices of the participants), Participant A can send a DND instruction that includes access authorization information identifying at least one authorized user that is allowed access to at least one of the communications devices during the conference call. In this example, the conference server 40 defines a policy 70 in which the conference server 40 sends a DND message with or without the access authorization information to each switch 20 that controls at least one of the communications devices 110 involved in the conference call or controls at least one of the personal communications devices of the conference participants. Thus, either the switch 20 can control access using the access authorization information or the conference server 40 can control access using the access authorization information. In the latter situation, the switch 20 can provide the originating caller information (e.g., external user ID) for the incoming call to the conference server 40 for access authorization.

For example, in one embodiment, the access authorization information can include the user IDs and/or telephone number(s) for external users 130 that are scheduled to be in the conference or meeting room (e.g., from calendar information or a conference system roster), so that these users can join the conference call or access one of the participants remotely. As a result, incoming calls to the conference room phone, conference bridge 50 or other participant communications device from these authorized external users will not be blocked by switch 20 or conference server 40. In addition, in embodiments in which the authorized external user is calling into the conference bridge 50, the direct access policy 70 can also be applied so that the external user need not provide an access code or other authenticating information to the conference bridge 50 to join the conference call. For example, the conference server 40 can maintain the user ID and/or telephone number of the authorized external user as a reference and compare this reference to the incoming call to grant the external user direct access to the conference call.

In another embodiment, the access authorization information can include the user IDs and/or telephone number(s) for a list of VIP external users 130, such as the bosses or assistants of the conference participants 120. In this embodiment, each authorized user can be allowed access to any communications device or to only specific communications devices (e.g., an assistant to Participant A may only be allowed access to the cell phone of Participant A). In yet another embodiment, the access authorization information can include a hierarchy level that allows superiors (e.g., those whose hierarchy level is superior or equivalent to the highest one in the meeting room or conference) to join the conference call itself and/or access one or more participants of the conference call.

In still a further embodiment, the access authorization information can include the user ID and/or telephone number of an external user 130 who is called by one of the participants during the conference call. For example, if Participant A calls an external user 130 ("Joe") from one of Participant A's communications devices during the conference call, and Joe does not answer, the conference server 40 is notified by switch 20, and either automatically or upon request from Participant A, adds Joe to the access authorization information to enable Joe to call back Participant A. The instruction to add Joe to the access authorization information can be included in the outgoing call to Joe, generated by the switch 20 upon receiving the outgoing call to Joe or Participant A can manually enter the instruction (e.g., by entering a DTMF code prior to or after dialing the number for Joe). The access authorization for Joe can be permanent (e.g., the duration of the conference call), for a selected time (e.g., 5 minutes) and/or for a determinate number of calls (e.g., allowed to call Participant A only one time).

FIG. 5 is a message flow diagram illustrating an exemplary message flow 500 for limiting external user access to an ongoing conference call, in accordance with embodiments of the present invention. Initially, at step 505, a conference call is established between Participant A's communication device 110a, Participant B's communication device 110b and other communications devices (not shown for simplicity) via the switch 20 and conference server 40. To block access to one or more of the communications devices by one or more external users during the conference call, at step 510, Participant A's communications device 110 sends an instruction with access authorization information to the conference server 40. Based on the instruction, at step 515, the conference server 40 defines a DND policy for the conference call, and at step 520, enables or activates the DND feature on switch 20.

At step 525, an incoming call to Participant A's communications device is received at switch 20 from an external user's communications device 110c. At step 530, the switch 20 provides the external user ID (e.g., originating caller information), such as the telephone number of the external user communications device 110c, to the conference server 40. The conference server 40 compares the external user ID with the access authorization information at step 535, and if there is a match (i.e., the external user is authorized to access Participant A's communications device 110a during the conference call), at step 540, the conference server 40 sends a message to the switch 20 to override the DND feature for this incoming call.

Thereafter, at step 545, the switch 20 notifies Participant A's communications device 110a of the incoming call (e.g., rings another line or activates a call waiting feature), and if Participant A answers the incoming call at step 550 (e.g., switches to the other line or the call waiting), at step 555, the switch 20 puts the conference call on hold for Participant A's communications device 110a while switch 20 establishes a call connection at step 560 between Participant A's communications device 110a and the external user's communications device 110c.

Figure 6:
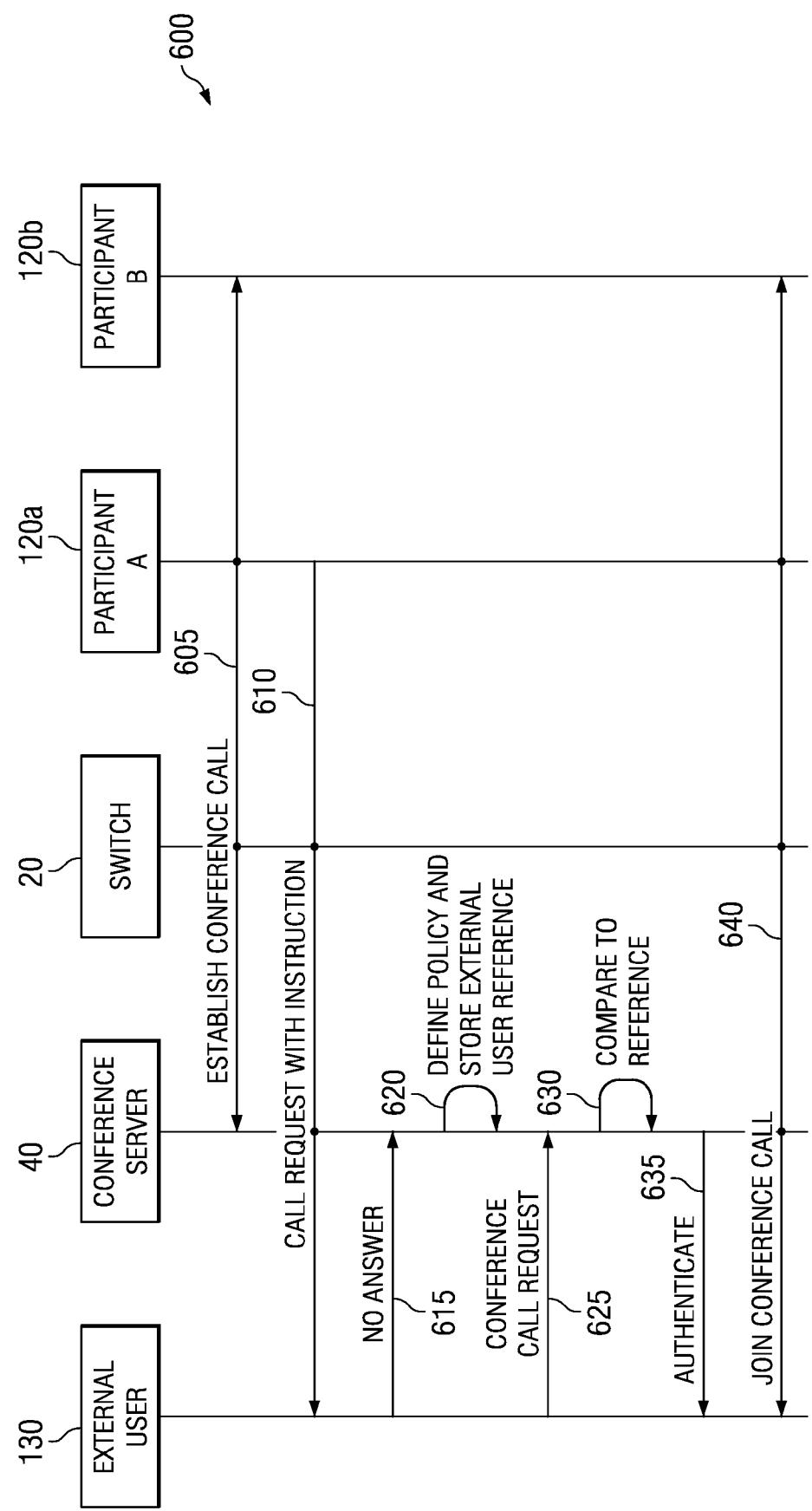
FIG. 6 is a message flow diagram illustrating an exemplary message flow for providing an external user with direct access to an ongoing conference call, in accordance with embodiments of the present invention.

FIG. 6 is a message flow diagram illustrating an exemplary message flow 600 for providing an external user with direct access to an ongoing conference call, in accordance with embodiments of the present invention. Initially, at step 605, a conference call is established between Participant A 120a, Participant B 120b and other participants (not shown for simplicity) via the switch 20 and conference server 40. During the conference call, at step 610, Participant A 120a places a call from a conference communications device or other communications device associated with Participant A to an external user 130 via switch 20. In accordance with embodiments of the present invention, the call request includes an instruction to the conference server.

As a result, when the call request is received at switch 20, the switch 20 routes the call to the conference server 40 for further routing and processing. The instruction can be automatically included with the call request generated by Participant A 120a (e.g., the instruction can be added to the call request by the communications device used by Participant A 120a, or if the call is made via the conference bridge, the conference server 40 can automatically generate the instruction), the switch 20 can automatically generate the instruction upon receiving the call request or Participant A can manually enter the instruction (e.g., by entering a DTMF code prior to or after dialing the number for the external user 130).

The conference server 40 routes the call to the external user 130, and if, at step 615, the external user 130 does not answer, at step 620, the conference server 40 defines a policy that allows the external user direct access to the conference call upon call-back by the external user 130. In particular, the conference server 40 stores a reference (e.g., a user ID or telephone number(s)) for the external user 130 and uses this reference to authenticate the external user 130. Thus, at step 625, when a conference call request is later received by the conference server 40 from the external user 130, at step 630, the conference server 40 compares the user ID or telephone number of the external user 130 to the stored reference to authenticate the external user 130, at step 635, and allow the external user to join the conference call, at step 640.

As a result, the external user 130 does not need to have knowledge of a specific conference bridge phone number and/or access code to join the conference call. Instead, the external user 130 can be directly connected to the conference call merely by placing a call to Participant A 120a at the phone number provided by a caller ID service or left in a voice mail box of the external user 130. In an exemplary embodiment, the instruction provided to the conference server with the initial call request also defines a policy that invokes a call forwarding feature on switch 20 that causes switch 20 to forward all incoming calls to Participant A to the conference server 40. In another exemplary embodiment, the call forwarding service can be enabled prior to the conference call (e.g., Participant A can manually enable the call forwarding service or the switch 20 can be programmed to automatically forward incoming calls to the conference server anytime Participant A's calendar indicates that Participant A is involved in a conference call). In either case, if the external user ID does not match the reference stored in the conference server 40, the conference server 40 can transfer the call back to the switch 20 for normal processing (e.g., voice mail, etc.).

Figure 7:
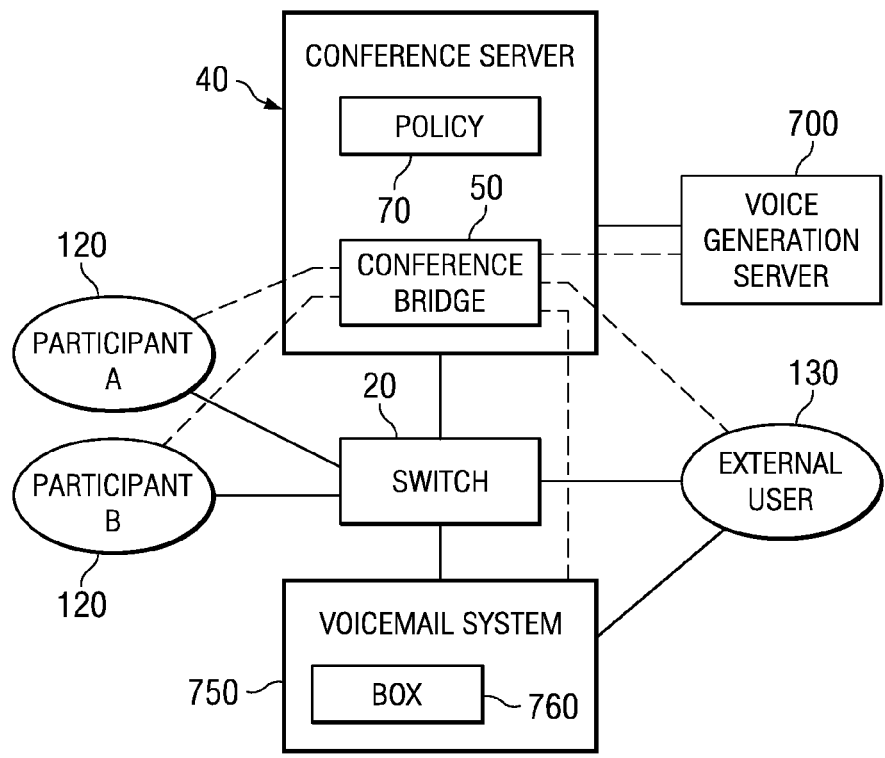
FIG. 7 illustrates an exemplary conferencing system for enabling external user access to an ongoing conference call by utilizing automated voice messaging, in accordance with embodiments of the present invention.

FIG. 7 illustrates an exemplary conferencing system for enabling external user access to an ongoing conference call by utilizing automated voice messaging, in accordance with embodiments of the present invention. In FIG. 7, Participants A, B and others (not shown for simplicity) are involved in a conference call via the conference bridge 50 on the conference server 40. During the conference call, one or more of the participants may provide an instruction to the conference server 40 to define a policy 70 invoking transmittal of an automated voice message that includes conference call information (e.g., conference bridge information, such as a conference phone number and access code) to a voice mail box of an external user 130.

For example, if Participant A 120 wants the external user 130 to join the conference call, Participant A 120 can place a call to the external user 130 via the switch 20 and conference bridge 50. If the external user 130 does not answer and the call is forwarded to a voice mail system 750 containing a voice mail box 760 for the external user 130, Participant A can provide an instruction (e.g., enter a DTMF code or accessing a GUI on the Participant A's communications device) to the conference server 40 that causes the conference server 40 to access a voice generation server 700 to provide an automated message to the external user's voice mail box with the conference call information. The conference server 40 provides the conference call information to the voice generation server 700 for generation of the automated message, and joins the voice generation server 700 to the call for playback of the automated message and recording thereof in the voice mail box 760 of the external user 130.

The instruction can include the conference call information or the conference server 40 can automatically generate the conference call information upon receiving the instruction. For example, the conference call information can include the conference bridge number, password, subject of the meeting, participants, meeting schedule and other information associated with the conference call. Thus, Participant A does not need to know the conference call information or manually record the conference call information into the voice mail box of the external user 130, which limits the interruption to the conference call.

Participant A can invoke the automated message at any time during the communications session between Participant A and the voice mail box 760 of the external user 130. For example, Participant A can leave a traditional message before invoking the automated message or can invoke the automated message and then leave a traditional message after the automated message. In addition, Participant A can listen to the automated message being recorded or can simply hang up while the automated message is playing. In the latter embodiment, the conference server 40 disconnects the call with the voice mail box 760 upon completion of the automated message.

In a further embodiment, the policy 70 maintains current status information regarding the conference call (e.g., the meeting room phone number, the duration of the conference call, the participants involved in the conference call and any other information pertaining to the conference call), and if there is change in the status information for the conference call, the policy 70 further invokes a subsequent call to the voice mail box 760 of the external user 760 and the recording of another automated message with the current conference call status information in the external user's voice mail box 760. For example, when the conference call ends, the policy 70 can establish a call connection between the conference server 40 and the voice mail box 760 of the external user 130 and join the voice generation server 700 to the call to provide an automated voice message informing the external user 130 that the conference call has ended.

Figure 8:
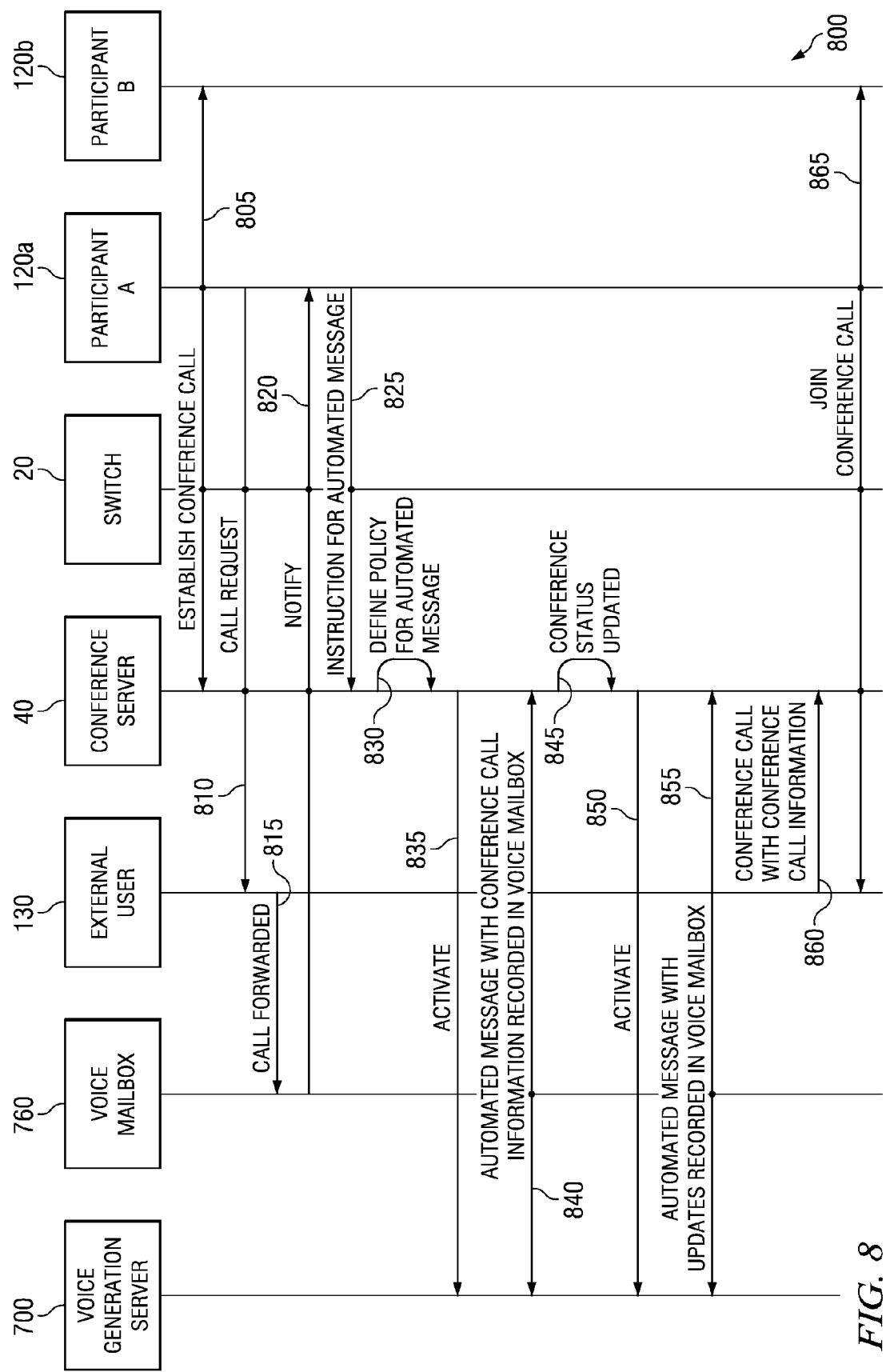
FIG. 8 is a message flow diagram illustrating an exemplary message flow for providing an external user with automated conference call information during an ongoing conference call, in accordance with embodiments of the present invention.

FIG. 8 is a message flow diagram illustrating an exemplary message flow 800 for providing an external user with automated conference call information during an ongoing conference call, in accordance with embodiments of the present invention. Initially, at step 805, a conference call is established between Participant A 120a, Participant B 120b and other participants (not shown, for simplicity). Thereafter, at step 810, a call is initiated by Participant A 120a to an external user 130. The call is routed through the switch 20 and the conference server 40. For example, in one embodiment, the call request is generated from the conference room phone (e.g., via a conference API). In another embodiment, the call request is generated from a communications device associated with Participant A, and switch 20 has knowledge that Participant A is currently involved in a conference call, and therefore, forwards the call request to the conference server 40 for further routing and processing.

If the external user does not answer, at step 815, the call is forwarded to the voice mail box 760 of the external user 130, and at step 820, Participant A 120a is notified (e.g., the voice mail box 760 "answers" the call). At any time during the call connection between Participant A 120a and the voice mail box 760, at step 825, Participant A 120a can provide an instruction (e.g., enter a DTMF code or accessing a GUI on the Participant A's communications device) to the conference server 40 that causes the conference server 40, at step 830, to define a policy for providing automated messages containing conference call information to the voice mail box 760.

For example, at step 835, the conference server 40 can activate a voice generation server 700 to provide an automated message to the external user's voice mail box 760 with the conference call information at step 840. As another example, at step 845, if there is change in the status of the conference call, at step 850, the conference server 40 can again activate the voice generation server 700 to record an automated message with the updated conference status information in the external user's voice mail box 760 at step 855. Thereafter, at step 860, the external user 130 can initiate a call to the conference server 40 with the conference call information stored on the voice mail box 760, and at step 865, join the conference call.

Figure 9:
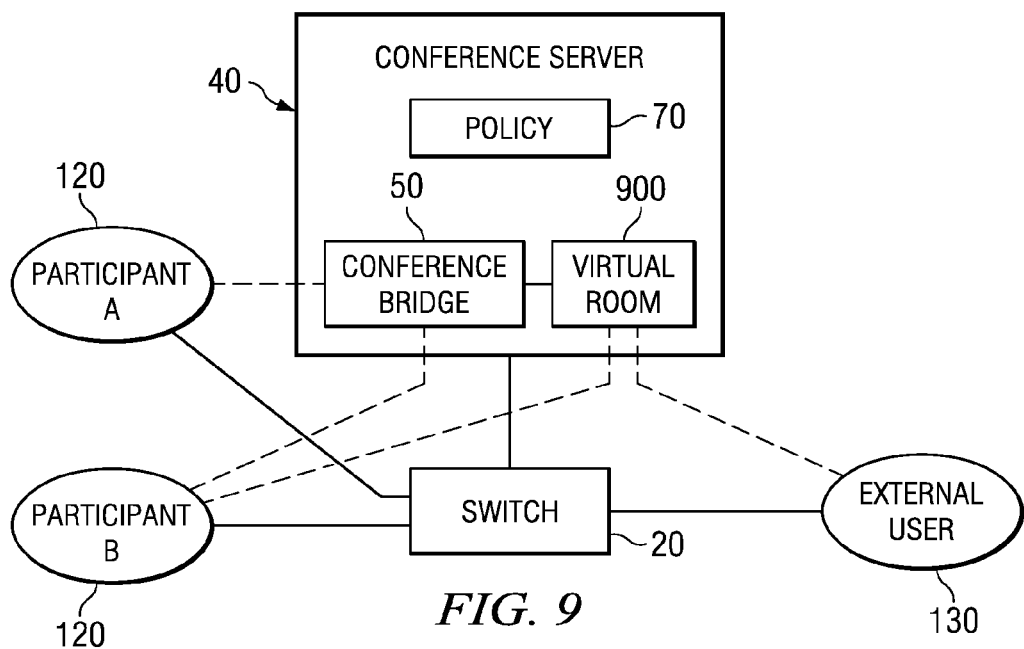
FIG. 9 illustrates an exemplary conferencing system for creating a virtual room between a conference participant and an external user during an ongoing conference call, in accordance with embodiments of the present invention.

FIG. 9 illustrates an exemplary conferencing system for creating a virtual room 900 between a conference participant and an external user during an ongoing conference call, in accordance with embodiments of the present invention. In FIG. 9, Participants A, B and others (not shown for simplicity) are involved in a conference call via the conference bridge 50 on the conference server 40. During the conference call, one or more of the participants may provide an instruction to the conference server 40 to define a policy 70 to create a virtual room between one of the participants 120 and the external user 130 during the conference call.

For example, if Participant A 120 attempts to initiate a communication session with the external user 130 via the conference bridge 50, and the external user 130 does not answer, the instruction to create a virtual room can be provided by Participant A 120 to the conference server 40. The instruction can be automatically generated by Participant A's communications device, can be manually entered by Participant A (e.g., entering a DTMF code prior to dialing the external user's number) or can be automatically generated in the conference server 40 upon receipt of the call from Participant A to the external user 130. For example, if Participant A 120 calls the external user 130 from a virtual room 900 within the conference server 40, the conference server 40 can automatically generate the instruction when the external user 130 does not answer. Based on the instruction, the conference server 40 defines a policy 70 to place incoming calls from the external user 130 to Participant A within a virtual room 900 on the conference server 40. In operation, the conference server 40 stores a reference (e.g., user ID and/or telephone number) for the external user which is compared to the incoming call to determine whether to apply the policy 70 to the incoming call.

Thereafter, the conference server 40 will apply the policy 70 to any incoming calls to Participant A or the conference bridge 50 from the external user 130 and create a virtual room for the incoming call from the external user 130 on the conference bridge 50. For example, if the external user 130 calls the phone number for the virtual room on the conference server 40, calls the conference bridge 50 managing the conference call or calls the phone number for one of the communications devices associated with Participant A and the call is forwarded to the conference server 40, the conference server can compare the user ID or phone number of the external user 130 to the stored reference to determine whether to place the incoming call in the virtual room 900.

If the incoming call is placed in the virtual room 900, Participant A is notified through the conference bridge or via a text message or voice message that the external user 130 is waiting in the virtual room 900 and provided with an indication (e.g., a link or phone number) of how to reach the virtual room 900. After discussion in the virtual room 900, Participant A can re-join the conference call alone or with the external user 130. For example, Participant A can grant access to the external user 130 to join the conference call, and the conference server 40 can configure the conference bridge 50 to reserve resources for the virtual room 900 and connect the virtual room 900 to the conference bridge 50. In addition, during the virtual room discussion, other participants (e.g., Participant B) in the conference call may be allowed to join the virtual room using the same or different link or phone number provided to Participant A for the virtual room 900.

FIG. 10 is a message flow diagram illustrating an exemplary message flow 1000 for creating a virtual room between a conference participant and an external user during an ongoing conference call, in accordance with embodiments of the present invention. Initially, at step 1010, a conference call is established between Participant A 120*a*, Participant B 120*b* and other participants (not shown for simplicity) via the switch 20 and conference server 40. During the conference call, at step 1020, Participant B 120*b* unsuccessfully attempts to call to an external user 130 via the conference server 40 and provides an instruction with the call to create a virtual room upon call-back by the external user 130. Based on the instruction, at step 1030, the conference server 40 defines a policy 70 that stores a reference identifying the external user 130 and that is able to create a virtual room for any incoming calls from the external user 130. Thereafter, at step 1040, when the external user 130 calls back Participant B 120*b* and the call is routed to the conference server 40, the conference server 40 creates a virtual room for the incoming call, notifies the Participant B 120*b*, and at step 1060, establishes a call connection between the external user 130 and Participant B 120*b* via the virtual room.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A conference controller, comprising:
a conference client operable to manage a conference call between conference participants;
an interface operable to receive at least one instruction during said conference call from one of said conference participants, said at least one instruction defining at least one policy to control access to said conference call by at least one user external to said conference call, said at least one policy creating a virtual room separate from said conference call between said user and one of said conference participants when said user places a call to said one of said conference participants, said virtual room enabling voice to be exchanged between said user and said one of said conference participants; and
a processor for executing said conference client to initiate said conference call and process said instruction;
wherein said at least one policy is automatically defined for each user external to said conference call that is called by one of said conference participants during said conference call such that said controller automatically leaves conference call information for accessing said conference call on a respective voice mail system for each said user upon receiving a notification that said respective user has been directly called by one of said conference participants.

2. The controller of claim 1, wherein said at least one policy further includes a do not disturb filtering rule applied to communications devices associated with said conference participants and said conference call, said communications devices including devices involved in said conference call and other devices of said conference participants, said filtering rule blocking access to said communications devices by said user during said conference call.

3. The controller of claim 2, wherein said filtering rule is applied to multiple users external to said conference call.

4. The controller of claim 3, wherein said at least one instruction includes access authorization information identifying at least one authorized one of said multiple users that is allowed access to at least one of said communications devices during said conference call.

5. The controller of claim 4, wherein said access authorization information includes limit information that provides limits on the ability of said at least one authorized user to access said at least one communications device.

6. The controller of claim 1, wherein said conference call information includes direct access information that allows said at least one user direct access to said conference call.

7. The controller of claim 6, wherein said at least one instruction further includes a reference identifying said user, and wherein said processor is operable to authenticate said user using said reference and to enable said user to directly access said conference call using said direct access information.

8. The controller of claim 7, wherein said direct access information includes call forwarding information for said one of said participants to forward a call from said user to said one of said participants to said conference call.

9. The controller of claim 1, wherein said at least one policy is further operable to invoke transmittal of an automated message that includes said conference call information to a voice mail box of said user, said conference call information including a call-back number that enables said user to join said conference call.

10. The controller of claim 9, wherein said conference call information is pre-configured and said instruction invokes said policy.

11. The controller of claim 9, wherein said at least one instruction further includes said conference call information.

12. The controller of claim 9, wherein said at least one instruction is received by said interface during a communications session between said one of said participants and said voice mail system containing said voice mail box of said user.

13. The controller of claim 9, wherein said at least one policy is further operable to invoke transmittal of automated updates, each indicating a current status of said conference call, to said voice mail box of said user.

14. The controller of claim 1, wherein said at least one instruction is automatically provided after an attempted virtual room communication session initiated by said user towards said one of said participants during said conference call and said policy is applied to future calls from said user to said one of said participants.

15. The controller of claim 1, wherein said at least one policy is further operable to provide access to said virtual room by other ones of said participants.

16. The controller of claim 1, wherein said at least one policy is further operable to provide said user access to said conference call from said virtual room.

17. A communications system, comprising:
a switch connected to establish a conference call between conference participants; and
a conference server operable to manage said conference call and connected to receive at least one instruction during said conference call from one of said conference participants, said instruction defining at least one policy to control access to said conference call by at least one user external to said conference call, said at least one policy creating a virtual room separate from said conference call between said user and one of said conference participants when said user places a call to said one of said conference participants, said virtual room enabling voice to be exchanged between said user and said one of said conference participants;
wherein said at least one policy is automatically defined for each user external to said conference call that is called by one of said conference participants during said conference call such that said conference server automatically leaves conference call information for accessing said conference call on a respective voice mail system for each said user upon receiving a notification that said respective user has been directly called by one of said conference participants.

18. The communications system of claim 17, further comprising:
a communications device associated with said conference call for initiating said at least one instruction to said conference server.

19. The communications system of claim 18, wherein said at least one policy includes a do not disturb filtering rule applied to communications devices associated with said conference participants, said filtering rule blocking access to said communications devices by multiple users external to said conference call during said conference call.

20. The communications system of claim 19, wherein said at least one instruction includes access authorization information identifying at least one authorized one of said multiple users that is allowed access to at least one of said communications devices during said conference call.

21. The communications system of claim 20, wherein said at least one instruction is generated by said communications device during an attempted communications session via said switch with said at least one authorized user.

22. The communications system of claim 18, wherein said conference call information includes direct access information that allows said user direct access to said conference call and said at least one instruction includes a reference identifying said user, and wherein said conference server is operable to authenticate said user using said reference to enable said user to directly access said conference call via said switch using said direct access information.

23. The communications system of claim 22, wherein said at least one instruction is automatically generated by said communications device for each user external to said conference call that is called on said communications device during said conference call.

24. The communications system of claim 18, further including:
a voice generation server communicatively coupled to said conference server for said at least one policy and operable to generate and transmit an automated message that includes said conference call information to a voice mail box of said user upon invocation of said at least one policy, said conference call information including a call-back number that enables said user to join said conference call.

25. The communications system of claim 24, wherein said conference call information is pre-configured and said instruction invokes said at least one policy.

26. The communications system of claim 24, wherein said at least one instruction includes said conference call information.

27. The communications system of claim 24, wherein said communications device generates said at least one instruction during a communications session via said switch between said one of said participants and said voice mail system containing said voice mail box of said user.

28. The communications system of claim 18, wherein said communications device automatically generates said at least one instruction after an attempted virtual room communication session initiated by said user towards said communications device via said switch during said conference call and said policy is applied to future calls from said user to said one of said participants.

29. A method for controlling access to a conference call, comprising the steps of:
establishing a conference call between conference participants;
receiving at least one instruction during said conference call from one of said conference participants;
defining at least one policy to control access to said conference call by at least one user external to said conference call based on said instruction, said at least one policy being automatically defined for each user external to said conference call that is called by one of said conference participants during said conference call such that conference call information for accessing said conference call is automatically left on a respective voice mail system for each said user upon receiving notification that said respective user has been directly called by one of said conference participants;

receiving notification of an incoming call from said user to one of said conference participants; and creating a virtual room separate from said conference call between said user and said conference participant based on said policy to enable voice to be exchanged between said user and said conference participant via said virtual room.

30. The method of claim 29, wherein said at least one policy further includes a do not disturb filtering rule applied to communications devices associated with said conference participants, further comprising:

blocking access to said communications devices by said user during said conference call.

31. The method of claim 30, wherein said at least one instruction further includes access authorization information identifying an authorized user that is allowed access to at least one of said communications devices during said conference call, and wherein said blocking access further includes the steps of:

comparing an identity of said user to said access authorization information; and connecting said call from said user to one of said communications devices when said identity matches said access authorization information.

32. The method of claim 29, wherein said conference call information includes direct access information that allows said user direct access to said conference call and said at least one instruction further includes a reference identifying said user, and further comprising:

authenticating said user using said reference; and connecting said call directly to said conference call using said direct access information.

33. The method of claim 29, wherein said defining said at least one policy further includes the step of:

invoking transmittal of an automated message that includes said conference call information to a voice mail box of said user, said conference call information including a call-back number that enables said user to join said conference call.

34. The method of claim 33, wherein said receiving said at least one instruction further includes the step of:

receiving said at least one instruction during a communications session between said one of said participants and said voice mail system containing said voice mail box of said user.

35. The method of claim 29, wherein said receiving said at least one instruction further includes the step of:

automatically providing said at least one instruction after an attempted communication session between said user towards said one of said participants during said conference call; and further comprising;

applying said policy to future calls from said user to said one of said participants.

* * * * *